(12) United States Patent
Kapich

(10) Patent No.: US 8,221,072 B2
(45) Date of Patent: Jul. 17, 2012

(54) ULTRA HIGH POWER DENSITY WIND TURBINE SYSTEM

(76) Inventor: Davorin D. Kapich, Carlsbad, CA (US)

( * ) Notice: Subject to any disclaimer, the term of this patent is extended or adjusted under 35 U.S.C. 154(b) by 672 days.

(21) Appl. No.: 12/290,790

(22) Filed: Nov. 4, 2008

(65) Prior Publication Data

US 2010/0111668 A1    May 6, 2010

(51) Int. Cl.
*F03B 1/00* (2006.01)
(52) U.S. Cl. .................................. 415/211.2; 415/206
(58) Field of Classification Search ............... 415/211.2, 415/219, 220, 226, 206, 147, 4.3, 4.5; 290/55
See application file for complete search history.

(56) References Cited

U.S. PATENT DOCUMENTS

| | | | | |
|---|---|---|---|---|
| 4,075,500 A | * | 2/1978 | Oman et al. | 290/55 |
| 4,084,918 A | * | 4/1978 | Pavlecka | 415/1 |
| 2008/0317582 A1 | * | 12/2008 | Cassidy | 415/4.2 |

* cited by examiner

*Primary Examiner* — Ross Gushi
(74) *Attorney, Agent, or Firm* — John R. Ross; John R Ross, III

(57) ABSTRACT

An ultra-high power density wind turbine system for producing energy from a wind including a structure having a shape adapted to produce a positive wind pressure on a high-pressure portion of a surface that faces into the wind and to produce a vacuum on two low pressure portions of its surface and one or more shrouded wind turbine systems mounted in the structure and comprising turbine stator vanes, turbine rotor blades and a turbine discharge duct adapted to channel turbine exhaust to exit the structure at the two low-pressure portions of the structure surface. In preferred embodiments the structure is a vertical tower that is generally cylindrical and the turbine is a horizontal axis axial flow shrouded wind turbine.

10 Claims, 15 Drawing Sheets

Table 8. $A_3K_7$ Mean Line, Thickness Distribution and Coordinates for Primary Turbine-blade Series

| $A_3K_7$ mean-line coordinates for $C_{L_0} = 1\cdot 0$ | | Thickness distribution co-ordinates $t/c = 20\%$ (Stations and ordinates given in percentage of chord) | |
|---|---|---|---|
| $x_o$ | $y_c$ | $x_t$ | $y_t$ |
| 0 | 0 | 0 | 0 |
| 0·5 | 0·397 | 1·25 | 3·469 |
| 1·25 | 0·836 | 2·5 | 4·972 |
| 2·5 | 1·428 | 5·0 | 6·918 |
| 5·0 | 2·359 | 10 | 9·007 |
| 10 | 3·689 | 15 | 9·827 |
| 15 | 4·597 | 20 | 10·000 |
| 20 | 5·217 | 25 | 9·899 |
| 25 | 5·623 | 30 | 9·613 |
| 30 | 5·852 | 35 | 9·106 |
| 35 | 5·936 | 40 | 8·594 |
| 40 | 5·897 | 45 | 7·913 |
| 45 | 5·753 | 50 | 7·152 |
| 50 | 5·516 | 55 | 6·339 |
| 55 | 5·200 | 60 | 5·500 |
| 60 | 4·814 | 65 | 4·661 |
| 65 | 4·367 | 70 | 3·848 |
| 70 | 3·870 | 75 | 3·087 |
| 75 | 3·328 | 80 | 2·406 |
| 80 | 2·746 | 85 | 1·830 |
| 85 | 2·133 | 90 | 1·387 |
| 90 | 1·485 | 95 | 1·101 |
| 95 | 0·801 | 100 | 0 |
| 100 | 0 | | |

FIG. 14

ULTRA HIGH POWER DENSITY WIND TURBINE SYSTEM

FIELD OF INVENTION

This invention relates to wind turbine generator systems and in particular to shrouded wind turbine generator systems.

BACKGROUND OF THE INVENTION

The majority of modern wind turbines generators presently in operation worldwide, utilize horizontal axis, large diameter, axial flow, propeller type wind turbine rotors. Typical aerodynamic efficiencies of these turbines based on frontal area with rotor diameter of ~230 feet are in range of 28 to 30 percent. With a wind velocity of 14 meter per second (about 31 mph) the tangental blades tip velocity is typically in the range of 270 feet per second. At those velocities, the noise level generated by the turbine blades is substantial. For this reason, many manufacturers recommend a distance of several hundred meters between turbines and residential housing. Typical power output of these utility size turbine generators (such as General Electric's Model GE1.5) is about 1500 kW.

Smaller wind turbines of the same type are being used for broad range of applications, such as utility bill reduction and battery charging. Typically, the blade diameters of these turbines range in sizes of 7 to 9 meters (23 to 30 feet) and have power output of about 10 kW to 20 kW at rated 14 m/s wind velocities. Blade tip velocities are about the same as in larger turbines and noise generation is substantial.

Large wind farms are currently being constructed or planned which contain or will contain as many as hundreds of wind turbine generators each producing outputs in the megawatt range so that the total output of some of these farms may be in the hundreds or thousands of megawatts. On these farms the wind turbines are typically spaced specific distances apart. Where land area is sufficient, turbines are spaced three to five rotor diameters apart perpendicular to the prevailing wind, and five to ten rotor diameters apart in the direction of the prevailing wind, to minimize efficiency loss. The "wind park effect" loss can be as low as 2% of the combined nameplate rating of the turbines.

Because of large rotor diameters, the "foot print" required for these turbines is substantial. Noise generation requires substantial distance between turbines and residential housing. The energy conversion of prior art wind turbines is poor in the range of about 28 to 30 percent as stated above. Also, there is a "bird kill" environmental problem that is unavoidable with this size of wind turbine rotors operating at high blades tip velocities.

Therefore, there is a great need for a more compact, higher efficiency wind turbine systems, with greatly increased total wind turbines power output per occupied acreage, reduced noise generation and virtual elimination of the "bird kill" problem.

SUMMARY OF THE INVENTION

The present invention provides an ultra-high power density wind turbine system for producing energy from a wind including a structure having a shape adapted to produce a positive wind pressure on a high-pressure portion of a surface that faces into the wind and to produce a vacuum on two low pressure portions of its surface and one or more shrouded wind turbine systems mounted in the structure and comprising turbine stator vanes, turbine rotor blades and a turbine discharge duct adapted to channel turbine exhaust to exit the structure at the two low-pressure portions of the structure surface. In preferred embodiments the structure is a vertical tower that is generally cylindrical and the turbine is a horizontal axis axial flow shrouded wind turbine. The design of the system results in a pressure drop across the turbine stage that is approximately three times the stagnation wind pressure. Cylinder sides of the tower are subjected to a negative pressure of approximately two times the wind stagnation pressure, while the turbine inlet facing the wind is subjected to a single positive stagnation pressure; resulting a total pressure drop across the turbine stage of approximately three times the wind stagnation pressure. The turbine efficiency is calculated to be in excess of 80 percent as compared to about 28 to 30 percent for prior art wind turbine systems.

The vertical towers of preferred embodiments provide support for single or multiple horizontal axis shrouded wind turbine assemblies which are located at desired heights above the ground level. Channeling structures are provided inside the towers to channel the turbine discharge air flow through portions of the towers and out of the towers into low pressure areas created by the wind on two sides of the cylindrical towers.

With 14 meters per second (31 miles per hour) wind velocity, the turbine rotor blades tip speed is approximately 48.5 feet per second compared to typical blades tip velocity for the existing large rotor conventional turbines of about 266 feet per second. This five fold decrease in rotor blades tip velocity plus the effect of shrouding is estimated to result in an order of magnitude reduction in noise generated by the turbine making the turbines of the present invention much better residential neighbors. The turbine efficiency is calculated to be in excess of 80 percent as compared to about 28 to 30 percent for prior art wind turbine systems.

BRIEF DESCRIPTION OF THE DRAWINGS

FIG. 14 shows Table 8 A3K7 Mean Line, Thickness Distribution and Coordinates for the Primary Turbine-blade Series from Dr. Horlock referenced book.

DETAILED DESCRIPTION OF PREFERRED EMBODIMENTS

Preferred embodiments of the present invention are described by reference to the drawings.

Turbine Generator Assembly

Figure 7:
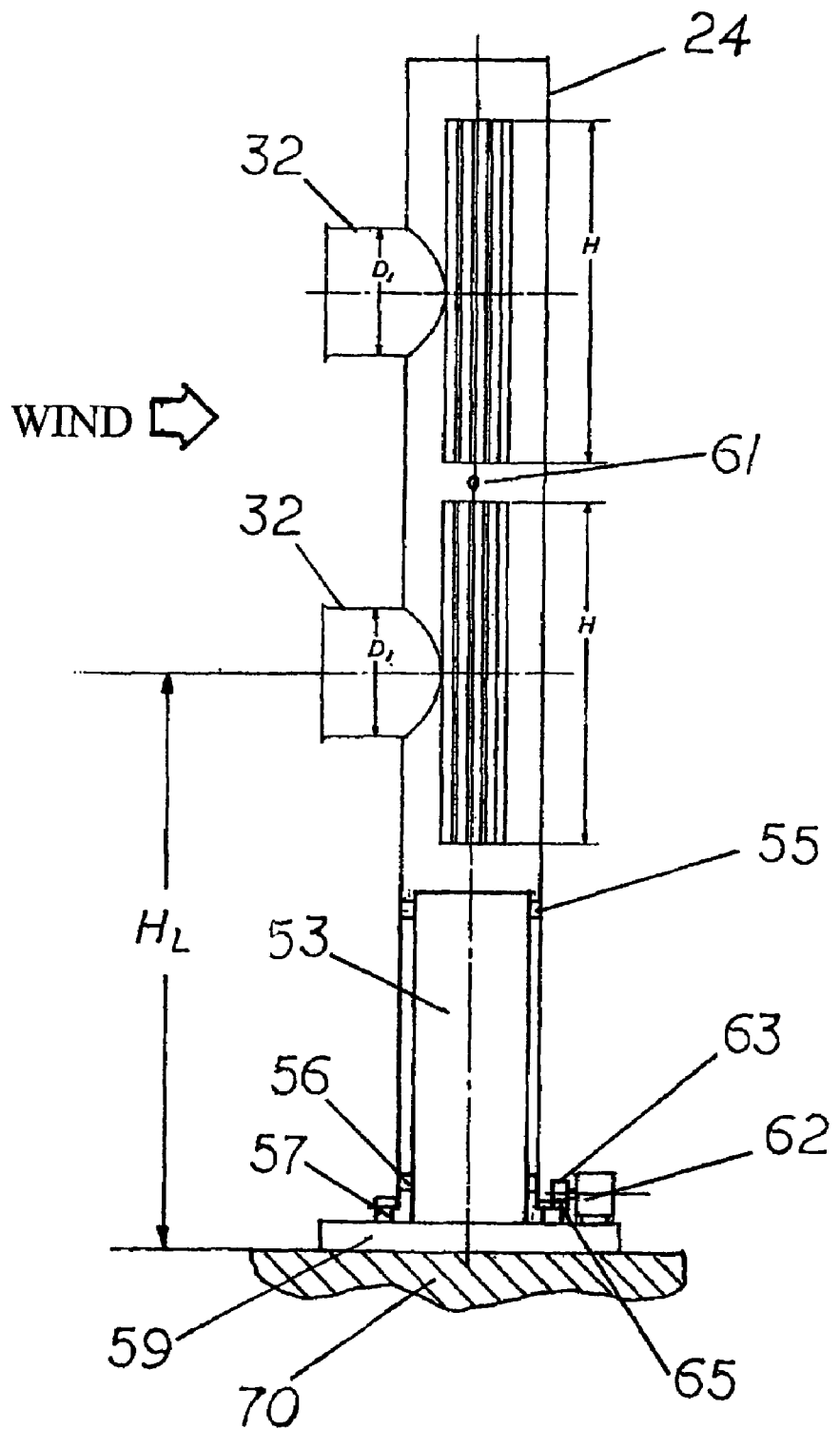
FIG. 7 shows overall arrangement of two turbines utilizing single cylindrical tower with two sets of turbine exhaust slots. Shown is a wind directional control system mounted at the base of the tower.

A first preferred embodiment of the present invention is shown in FIG. 7. This embodiment includes two wind turbine-generators entirely shrouded in turbine housings 32 which are mounted in generally cylindrical towers 24. The turbine design is a typical high efficiency axial flow reaction turbine with turbine stator vanes positioned in front of turbine rotor blades.

Figure 1:
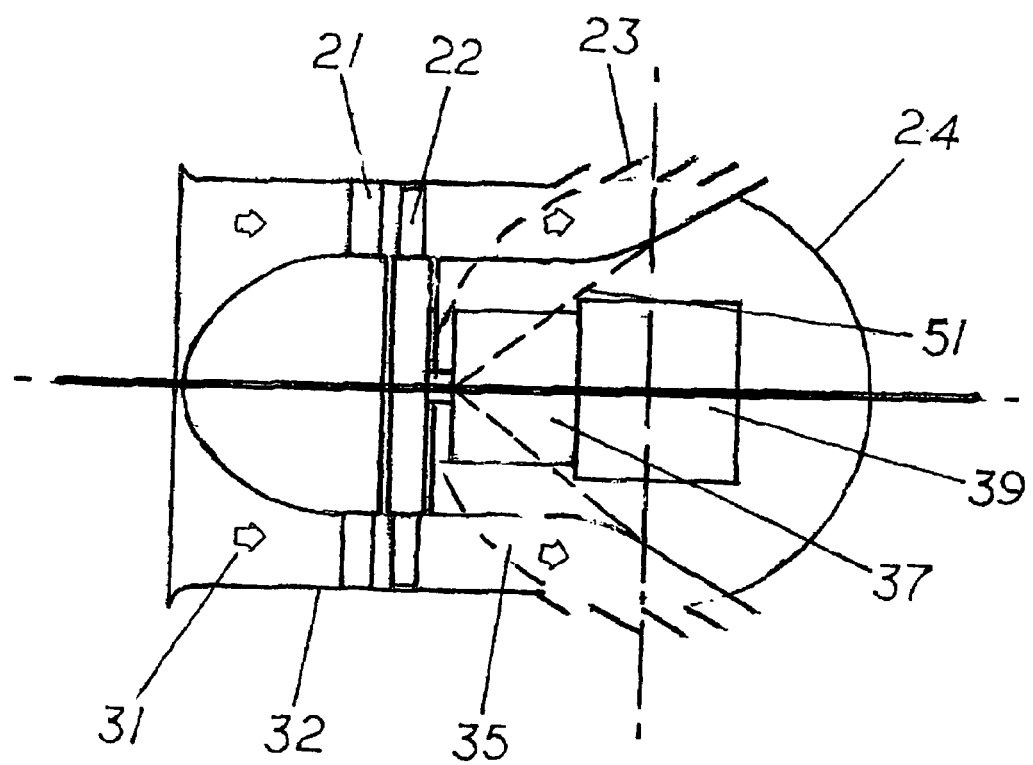
FIG. 1 is a cross sectional drawing along the horizontal turbine axis that includes turbine stator, turbine rotor, electric generator and turbine exhaust ducting.

FIG. 1 is a cross sectional top view of a wind turbine generator assembly of a preferred embodiment. Important features are shown. These include wind intake duct 31 enclosed by turbine housing 32. Turbine stator vanes 21 are located upstream of turbine rotor blades 22 which power electric generator 39 through the speed increasing gear box 37. Turbine discharge duct 35 channels turbine exhaust flow into the turbine exhaust slots 23 mounted on two sides of cylindrical tower wall 24.

Figure 11:
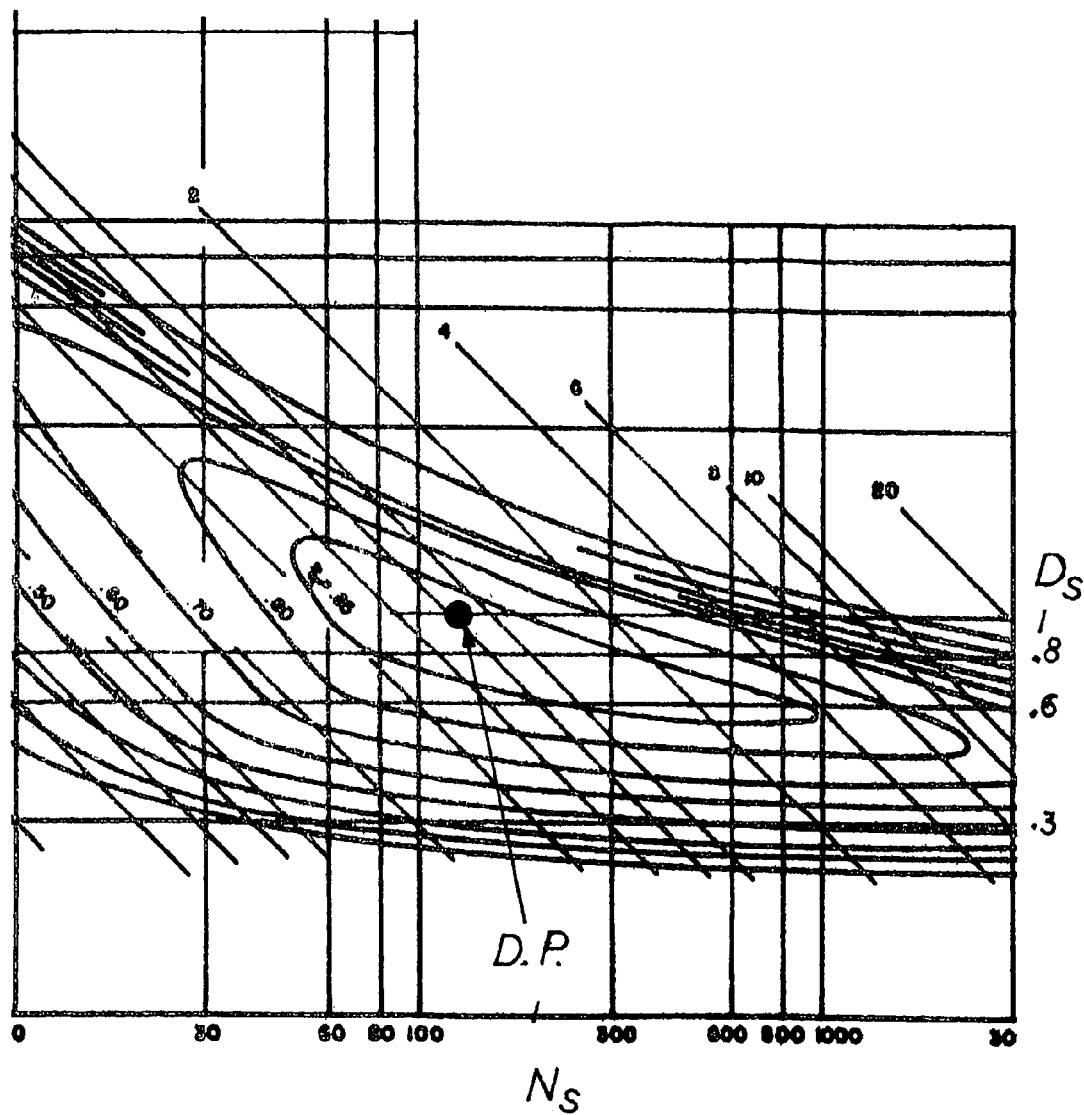
FIG. 11 shows specific speed-specific diameters used for optimization of turbine geometry and turbine RPM.

The optimum diameter of turbine stator vanes 21 and turbine rotor blades 22 and the turbine rotating speed are calculated from the specific speed-specific diameter design point shown on the speed-specific diameter diagram FIG. 11 part of the ASME Paper No. 60-WA-130 by Dr. O. E. Balje. All ASME Publications are obtainable from ASME Customer Service at infocentral@asme.org or by calling 1-800-843 2763. The optimum specific speed and optimum specific diameter were selected for all turbine sizes in order to achieve maximum possible turbine efficiency. Optimum reaction rate of approximately 50% results a 50% pressure drop across the stator vanes and 50% across the rotor blades. Relationship of specific speed-specific diameter and reaction rate parameters is well described in the ASME Paper No. 60-WA-130 written by Dr. O. E. Balje.

The specific speed and specific diameter are generally known as "similarity parameters" that are widely used for initial optimization in turbine designs. Specific speed (Ns) and specific diameter (Ds) shown in FIG. 11 and in the equations set forth below are based on turbine discharge volumetric flow (V3) defined in cubic feet per second, turbine adiabatic head (Had) defined in foot pounds per pound, turbine speed (N) defined as RPM and turbine wheel tip diameter (D) defined in feet. Equations shown in the FIG. 11 diagram define the specific speed-specific diameter relationship as:

$$Ns = \frac{N(V3)^{0.5}}{(Had)^{0.75}}$$

$$Ds = \frac{D(Had)^{0.25}}{(V3)^{0.5}}$$

The chosen design point of the preferred embodiment for the specific speed is Ns=128 and for the specific diameter is Ds=0.73. It is shown as point D.P. on the FIG. 11 with turbine efficiency in excess of 80%. Based on twin turbine tower arrangement shown in FIG. 7 and the 0.75 MW rated individual turbines operating in a 14 meter per second wind speed, the optimum turbine rotor blades 22 diameter is 21.8 meter and optimum rotating speed is 13 RPM. Generally the RPM increases and decreases approximately linearly with the wind speed. As shown in FIG. 11 higher specific speeds all the way up to 300 or 600 can be chosen to increase the turbine RPM without affecting significantly the turbine efficiency. Turbine blades generated noise level, turbine cost and electric generator cost would be the trade-off factors that depend on the level of turbine power output.

TABLE 1 below lists the main parameters used for optimization of the 0.75 MW preferred embodiment turbine.

TABLE 1

| | |
|---|---|
| Wind velocity (m/sec) | 14.0 |
| Wind dynamic head (ft lb/lb) | 32.77 |
| Total turbine dynamic head (ft lb/lb) | 98.31 |
| Turbine volumetric flow (ft3/sec) | 94,865 |
| Turbine mass flow rate (lb/sec) | 7115 |
| Turbine adiabatic efficiency from FIG. 11 | 0.80 |
| Turbine power output (kW) | 759.0 |
| Turbine tip diameter (m) | 21.80 |
| Turbine speed (RPM) | 13.0 |
| Turbine blades tip speed (ft/sec) | 48.6 |

The design of turbine stator vanes 21 and turbine rotor blades 22 is preferably optimized per NACA Primary Turbine-blade Series $A_3K_7$ Table 8 described in book "Axial Flow Turbines" Fluid mechanics and thermodynamics by Dr. J. H. Horlock 1973. FIG. 14 is a copy of this Table 8.

Figure 13:
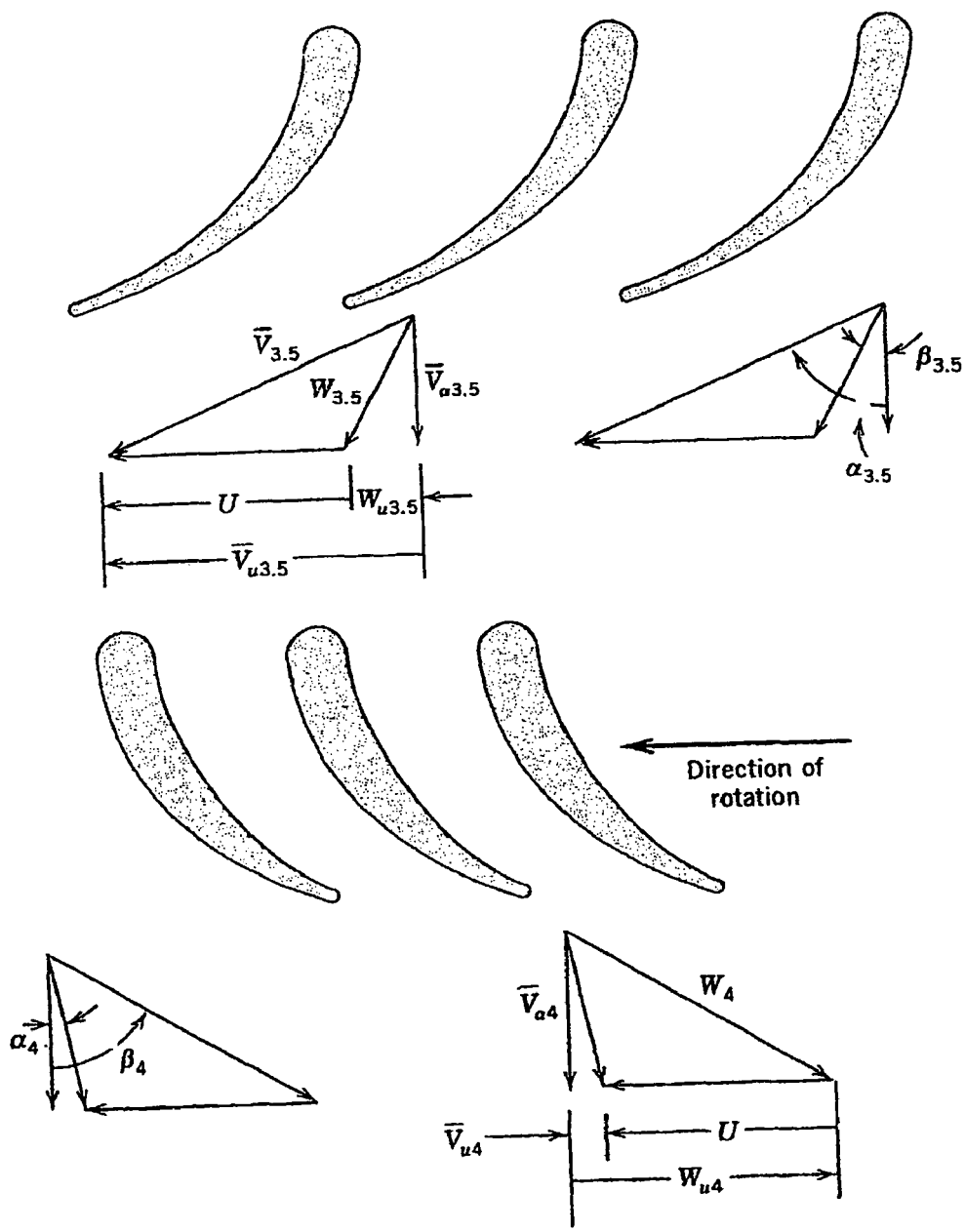
FIG. 13 shows turbine stator and rotor blades velocities and angles for a typical axial flow reaction turbine.

FIG. 13 shows velocity diagrams and angle definition of stator and rotor blades for a typical axial flow reaction type turbine. Results of optimized flow angles and absolute and relative velocities of stator vanes 21 and rotor blades 22 of the preferred embodiment wind turbine are listed in the TABLE 2 below.

TABLE 2

| Performance Data | |
|---|---|
| Wind velocity, Va3.5 (ft/sec) | 45.94 |
| Stator vanes exit velocity, V3.5 (ft/sec) | 56.25 |
| Rotor blades tip speed, U (ft/sec) | 48.56 |
| Stator vanes exit angle, Alpha 3.5 (deg.) | 30.0 |
| Rotor blades inlet angle, Beta 3.5 (deg) | 0.33 |
| Rotor blades exit angle, Beta 4 (deg) | 30.0 |
| Rotor blades exit velocity, W4 (ft/sec) | 56.25 |
| Rotor blades exit tang. velocity, Vu 4 (ft/sec) | 0.16 |

TABLE 2 values are the results of more detailed turbine blades analysis and are sufficient to define detailed blades profiles A3 K7 described in the referenced Dr. Horlock book.

Electric generator 39 is driven by the speed increasing planetary type gear box 37. Due to variable wind velocities, turbine rotor blades 22 generally operate at variable rotating speeds which causes electric generator 39 to operate at variable rotating speeds. Since the electric output frequency must match the electric grid frequency, each electric generator 39 is required to utilize a frequency converter (not shown) to convert variable frequency generated by the electric generator 39 into 60 Hz or 50 Hz grid matching frequency. Pulse-width modulated frequency converters are generally known as most efficient frequency converters. GE1.5 wind turbine utilizes 1500 kW pulse-width modulated IGBT frequency converter.

There are other types and makes of frequency converters that can be utilized for the preferred embodiment 750 kW wind turbine.

Turbine Towers

Details of a preferred turbine tower are provided below. The preferred tower is generally cylindrical with approximate height of 90 meter and a diameter of 22.9 meter. The optimum tower height depends generally on the wind distribution with height in the particular ground location. The tower preferably sits on a rotary track so that the turbines can always be facing directly into the wind.

Figure 2A:
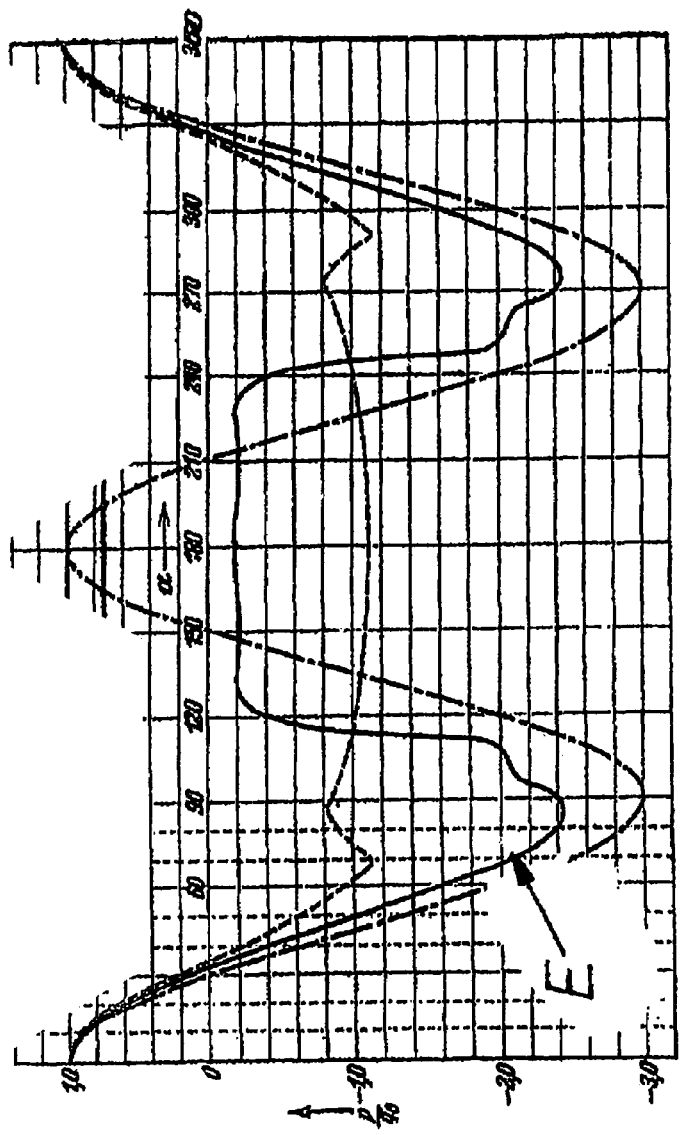
FIGS. 2A and 2B is a diagram of static pressure distribution around the perimeter of the vertical cylinder supporting the horizontal axis wind turbine or turbines.
Figure 2B:
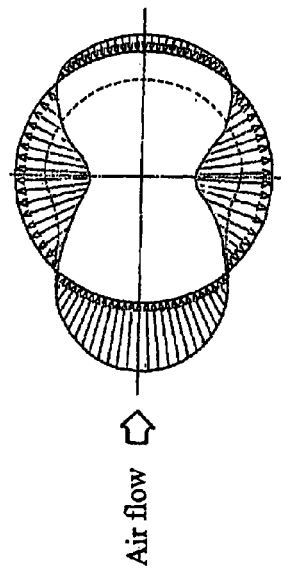

FIG. 2B shows the static pressure distribution around perimeter of a cylinder subjected to air flow that is perpendicular to the cylinder. FIG. 2A is a plot of pressure vs angular position around a cylinder where zero and 360 degrees is the position of the cylinder facing into the wind. The curve marked with letter E represents actual test data for a fully developed turbulent flow at Reynolds Number above 670,000. The 21.8 meter diameter cylinder exposed to 14 meter per second wind has a Reynolds number of approximately 6,676,613. A wind speed of merely 1.4 meters per second will provide a Reynolds Number above 670,000; therefore, Curve E should be applicable for all wind speeds above 1.4 m/s. At wind speeds below 1.4 m/s wind flow around cylinders become laminar and the pressure drop across the turbine will be only about half that indicated by Curve E.

FIG. 2A shows that for the cylindrical tower, the maximum pressure is at zero degrees on the cylinder. Angle Alpha shown on FIG. 2A identifies the angular location of the pressure reading. (Zero degree represents the center of the circumference of the tower facing the wind.) Since the turbine inlet is always facing the wind, the turbine inlet is always subjected to the single positive dynamic pressure show in FIG. 2A as $p/Qo=1.0$ where p is the pressure at a particular location and Qo is the wind stagnation pressure. The pressure on the portion of the cylindrical tower facing away from the wind from about 120 degrees to about 290 degrees is approximately constant slightly below static atmospheric pressure. The chart shows that the pressure on both sides at 90 degrees and 270 degrees is greatly reduced as compared to the rear region of the tower and the negative (vacuum) pressure in these regions is more than twice as large as the positive pressure head at the highest pressure point at the center front (zero degree) portion of the tower. Thus, the total pressure differential across the wind turbine stage adds to approximately two to three times the actual wind stagnation pressure.

Actual aerodynamic tests conducted on a small scale model with a 24 inch diameter vertical tower and a simulated turbine air flow through turbine exhaust slots has confirmed the total pressure differential of 2.25 times the wind stagnation pressure. With larger scale towers and higher Reynolds numbers, Applicant expects that the total pressure differential will increase above 2.5 times the wind stagnation pressure.

Two pressure distribution curves are shown and identified in FIG. 2A as follows: "under-critical" pressure distribution L curve with Reynolds number of 186,000 and "above-critical" pressure distribution curve E with Reynolds number of 670,000, where the Reynolds number of air flow around the cylindrical body is defined as wind velocity (in feet per second) multiplied by cylinder diameter (in feet), divided by the air kinematic viscosity (in feet square per second). Only the "above-critical" pressure distribution curve E shown in FIG. 2 applies here because even with 1.4 meter per second wind velocity, the preferred embodiment Reynolds number is above 670,000 which is still in the turbulent region, thus producing desired pressure distribution. However, the turbine towers operating below Reynolds number of approximately 670,000 would still have a power output of approximately 55% of the above critical Reynolds number operation.

Figure 3:
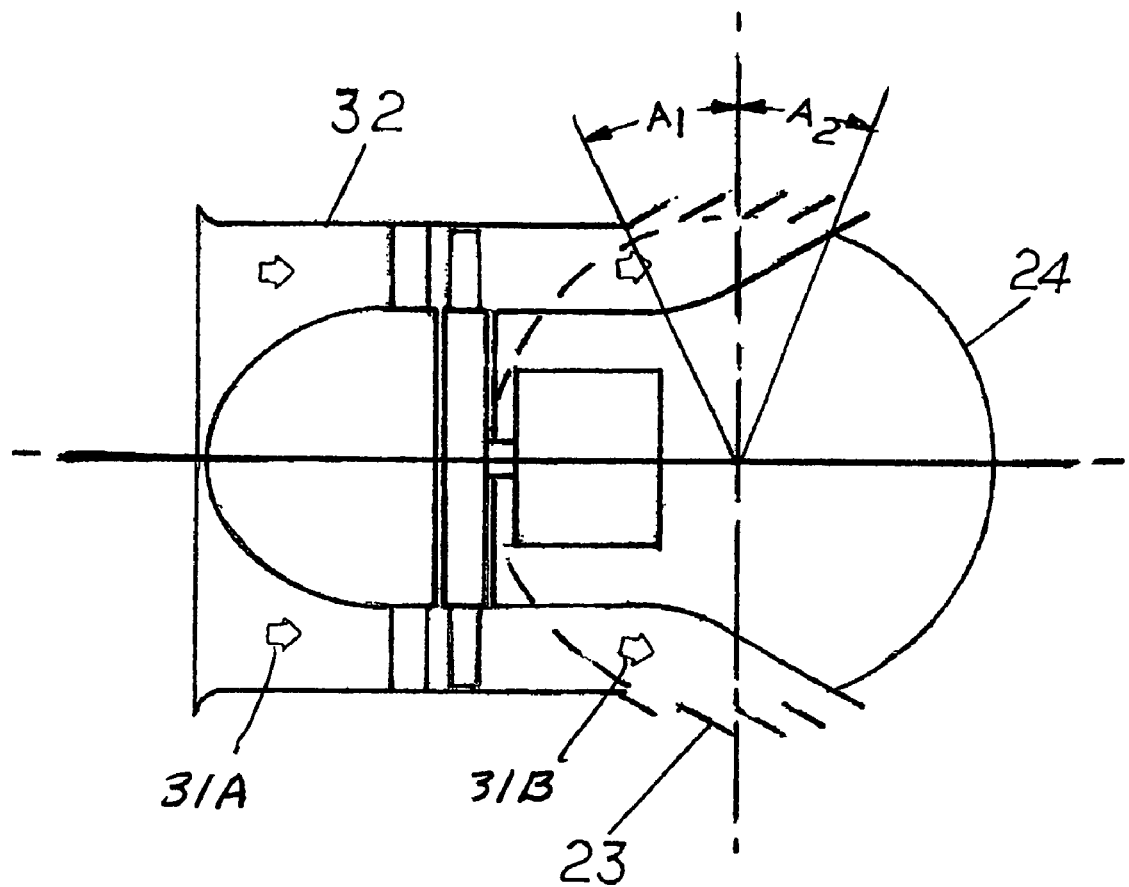
FIG. 3 shows the optimum location of slots that distribute turbine exhaust flow along the vertical cylinder wall.

FIG. 3 is a cross sectional drawing along the turbine axis showing the optimum position of turbine exhaust slots 23 on both sides of the tower relative to cylinder tower wall 24 and turbine housing 32. As shown on FIG. 2A the region of minimum static pressure is a region between angle A1 at about 30 degrees and angle A2 at about 15 degrees on one side of the tower and a similar region on the opposite side of the tower. Since the negative pressure in these regions is more than two times the wind dynamic head at the portion of the tower facing directly into the wind, the total pressure difference, between the turbine inlet stagnation pressure and static pressure at turbine exhaust slots 23, is approximately three times the wind dynamic head.

Figure 4:
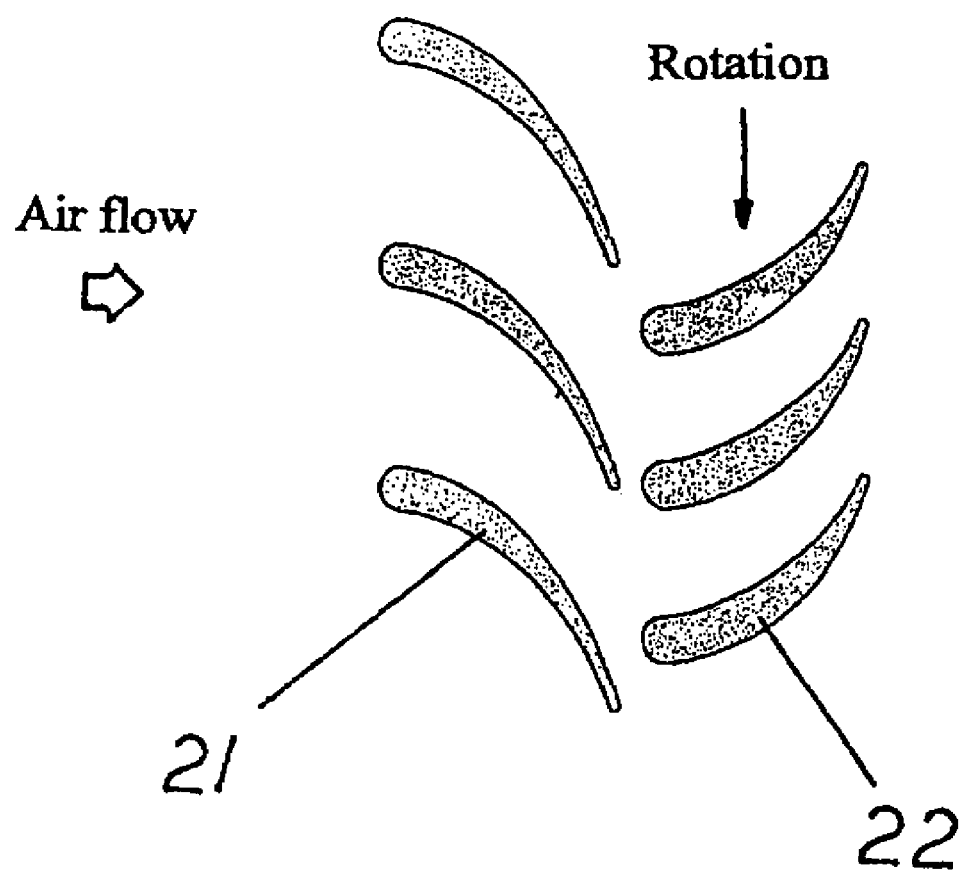
FIG. 4 shows arrangement of stator vanes and rotor blades of a typical reaction type axial flow turbine.

FIG. 4 shows cross sections of turbine stator vanes 21 and turbine rotor blades 22 of a preferred reaction turbine design, relative to the air flow direction. Note that stator vanes are stationary and the rotor blades are rotating. This view is looking from the side of the turbine where the rotor blades are traveling downward. The air flow through the vanes at this location is as shown in the axial turbine direction. With this design air enters the vanes parallel to the turbine axis as shown by arrows 31A and exits the turbine blades in a direction parallel to the turbine axis as shown by arrows 31B as shown in FIG. 3.

Figure 5:
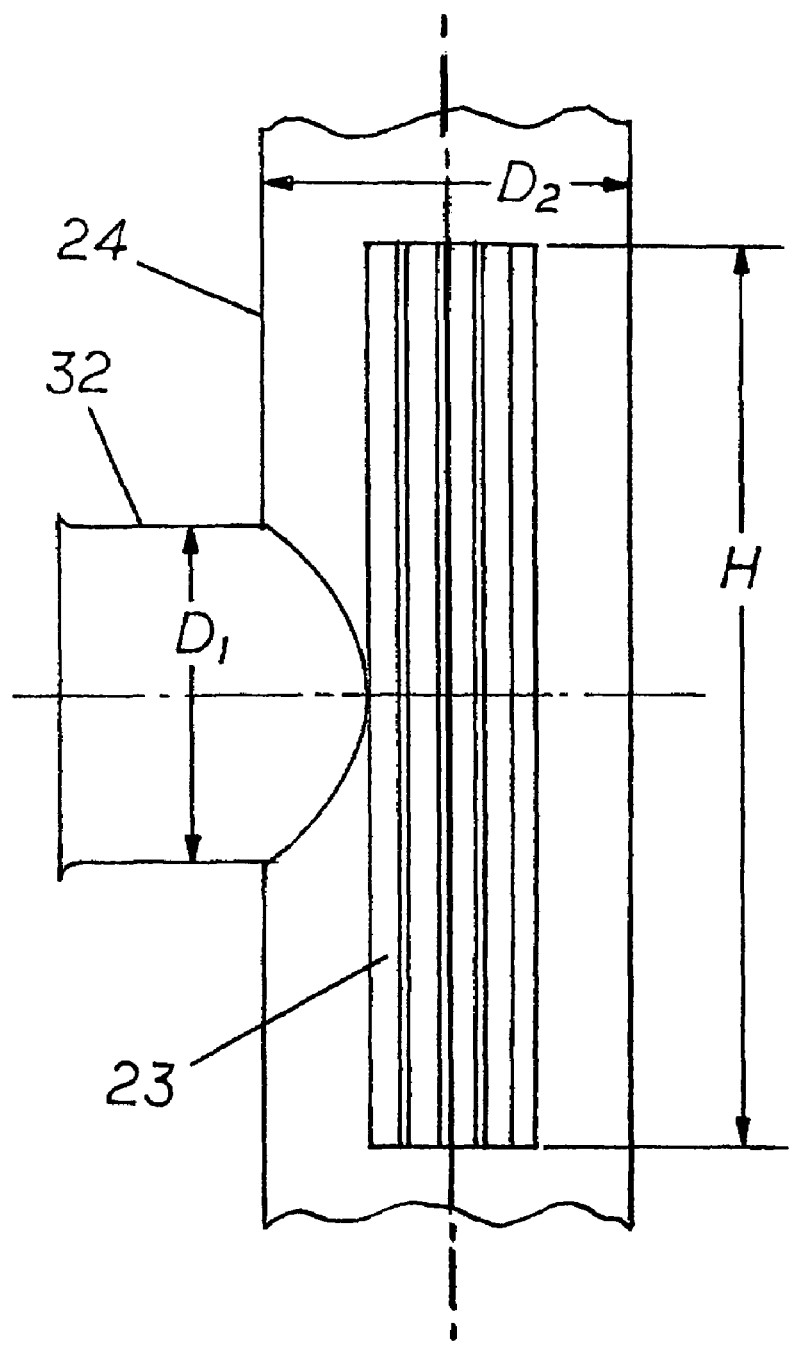
FIG. 5 shows optimum size and optimum location of turbine exhaust slots relative to the horizontal axis turbine housing location.

FIG. 5 shows side view and location of turbine exhaust slots 23 in relation to turbine housing 32 and cylinder tower wall 24. Estimated optimum height of turbine exhaust slots 23 shown as H is on the order of 1.5 to 2.5 times the diameter of the cylinder tower wall 24 shown as $D_2$. Optimum size of the diameter $D_2$ is estimated to be between 100% and 150% of the turbine housing 32 diameter $D_1$. In a preferred embodiment designed for high power output wind farms the $D_2$ is 21.8 meter and $D_1$ is 22.9 meter.

Figure 6:
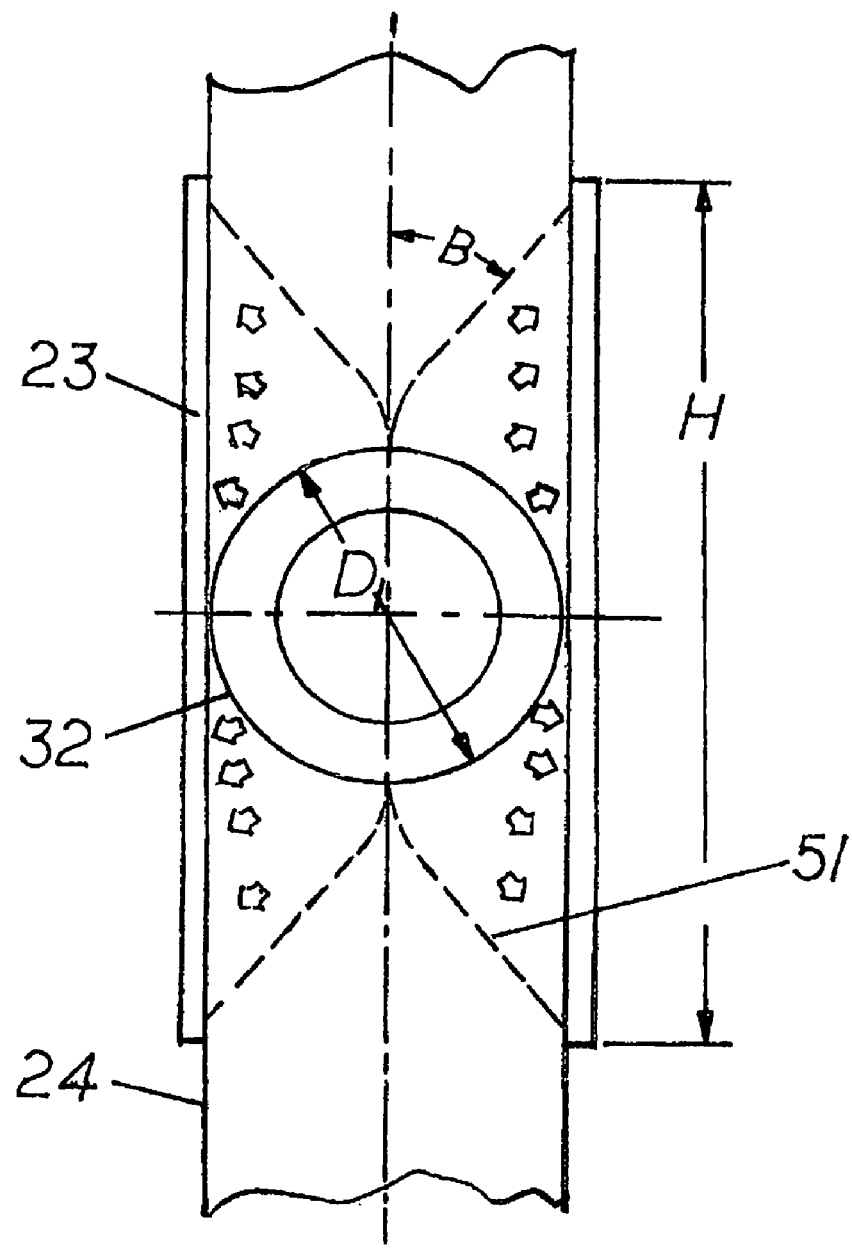
FIG. 6 shows frontal view into the turbine housing, optimum configuration of turbine exhaust ducts connecting into the turbine exhaust slots.

FIG. 6 show frontal view of the turbine housing 32 and turbine exhaust flow guides 51 distributing turbine exhaust flow from turbine discharge duct 35 (shown in FIG. 1) to the turbine exhaust slots 23. The main function of turbine exhaust flow guides 51 is to achieve as even as possible the turbine exhaust flow distribution along the height H of turbine exhaust slots 23. Optimum angle of the exhaust flow guides 51 shown as B is estimated at about 40 degree.

FIG. 7 show side view of overall tower system design utilizing single cylinder tower 24 with two turbines 32 and two sets of turbine exhaust slots 23. Main support of the cylinder tower 24 is provided by turbine support post 53 solidly attached to support base 59 which is anchored solidly into the foundation 70. Upper radial bearing 55 and lower radial bearing 56 support side loads generated by wind forces. Thrust bearing 57 supports the total weight of the turbine system assembly while allowing the turbine system assembly to be freely rotated into the optimum wind direction. In this preferred embodiment designed for wind farms, HL is at least 30 meter, H is 40 meter, D1 is 21.8 meter and D2 is 22.9 meter. The total tower height is approximately 90 meter.

As shown in FIG. 7 the static pressure sensors 61 mounted on each side of the cylinder tower wall 24 provide electric signals that controls the rotation of electric motor 62 which rotates motor gear 63 which in turn causes rotation of tower gear 65 positioning the wind turbines into the optimum wind direction. This is accomplished by automatically adjusting pressure signals from static pressure sensors 61 positioned on each side of the cylinder tower wall 24 to be equal, which is possible only when the axes of two turbines 32 are positioned straight into the wind which results in a minimum pressures at exhaust slots 23 and maximum pressure at inlet into turbines 32.

Figure 15:
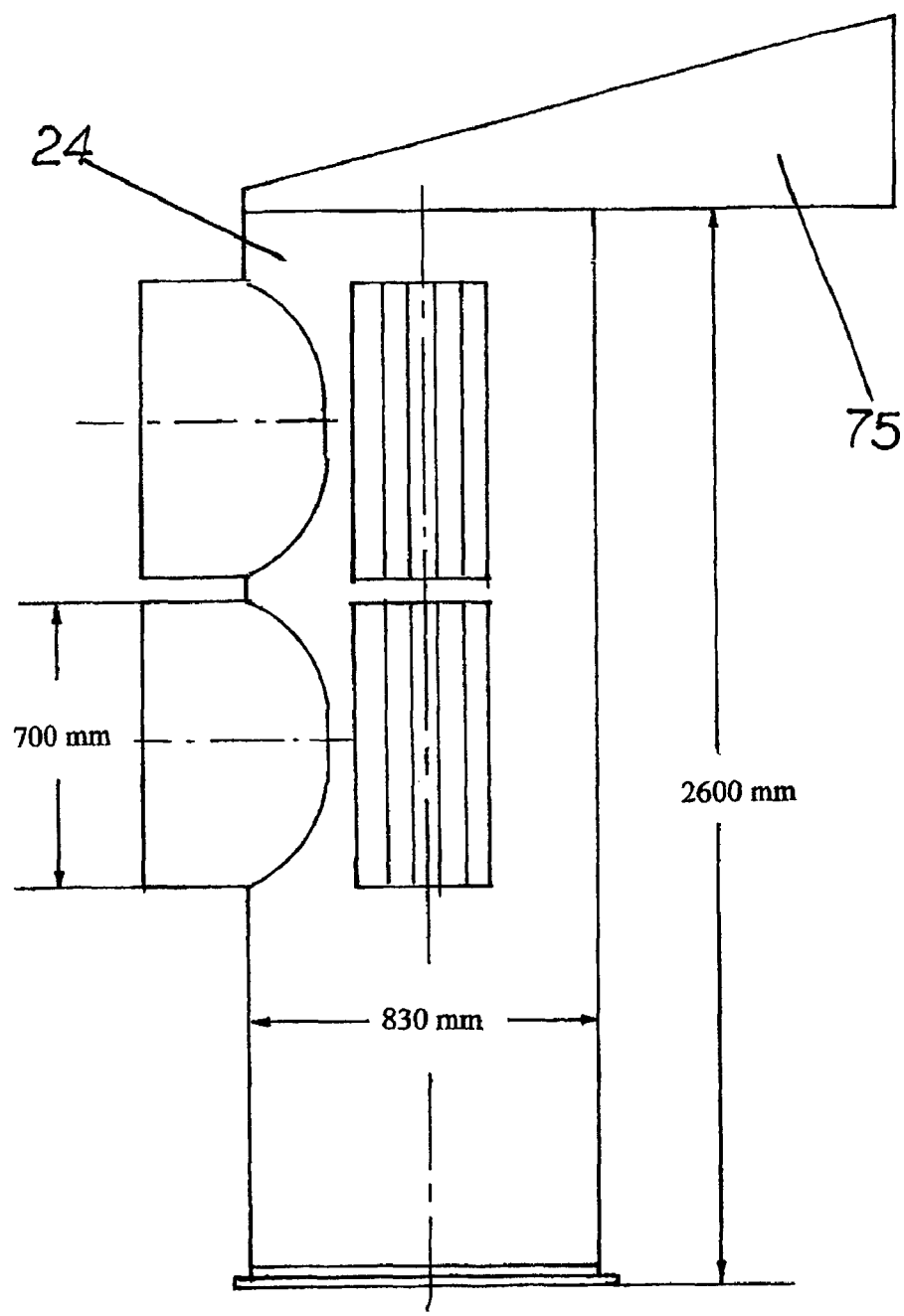
FIG. 15 is a relatively small wind turbine structure with a vain to keep the turbine pointed into the wind.

Alternatively, with smaller turbines such as a 2 KW turbine tower, the positioning of the turbine axis into the wind is preferably accomplished with a vertical vane 75 solidly attached to the top of the cylinder tower 24 as shown in FIG. 15.

Variable Flow Vanes

Figure 8:
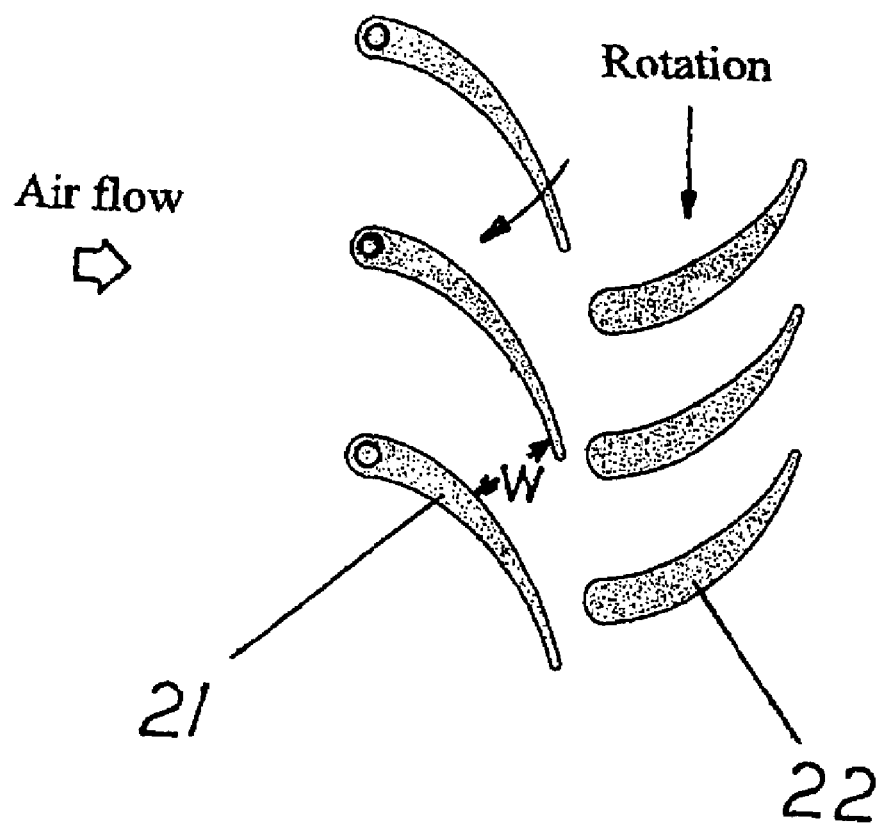
FIG. 8 shows adjustable turbine stator vanes with adjustable turbine air flow area.
Figure 9:
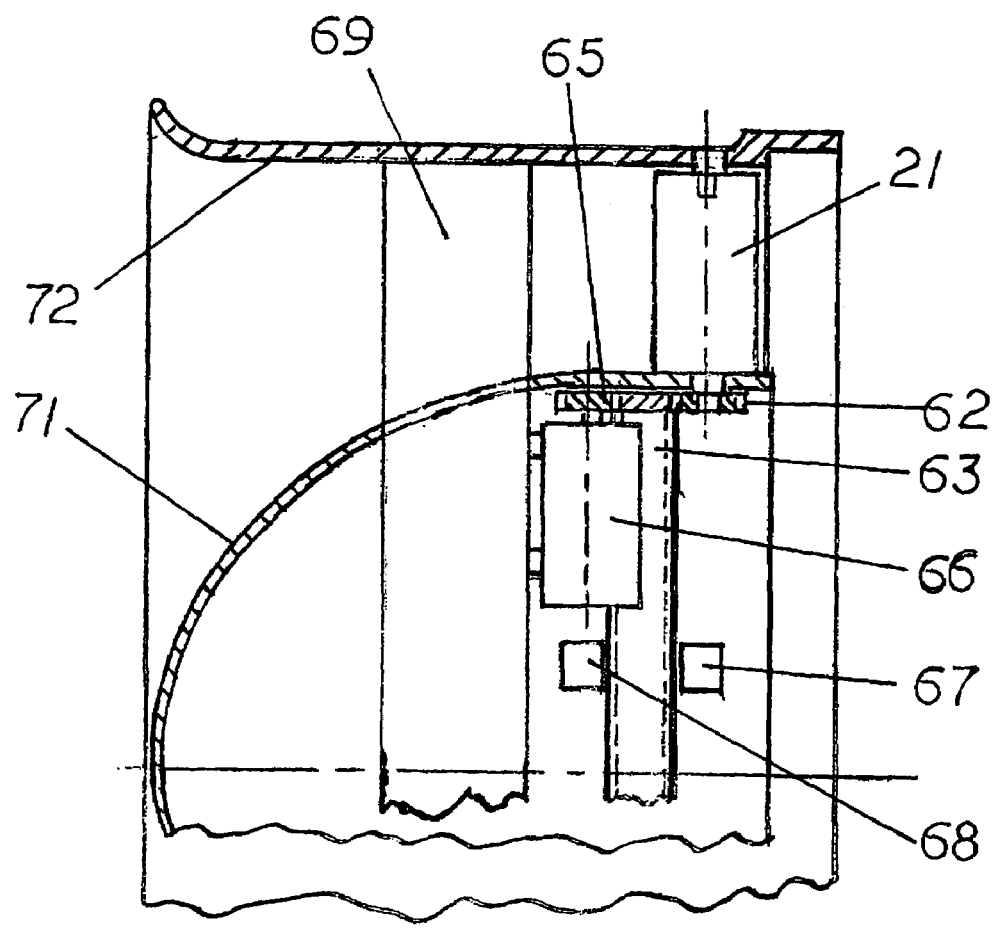
FIG. 9 shows the control system arrangement for adjustable turbine air flow area.

FIG. 8 shows optional variable flow area turbine stator vanes 21 which have capability to adjust the turbine stator vanes 24 for optimum flow width area W. Alternatively, in case of extreme weather conditions, the turbine stator vanes can substantially or completely close the width area W to prevent excessive power output or damage to the turbine system. FIG. 9 shows the control system required for adjustment of the turbine stator flow area as shown in FIG. 8. Angular position of turbine stator vanes 21 is adjusted by gears 62 which are rotated by motion of gear ring 63 which in turn is rotated by motor gear 65 solidly mounted to the shaft of the vane control electric motor 66. Gear ring 63 is guided in precise position by ring guide plates 67 and 68. Inlet vane 69 is solidly attached to the inlet hub 71 and inlet wall 72. Vane control electric motor 66 is solidly attached to the inlet vane 69.

Wind Farms

Figure 10:
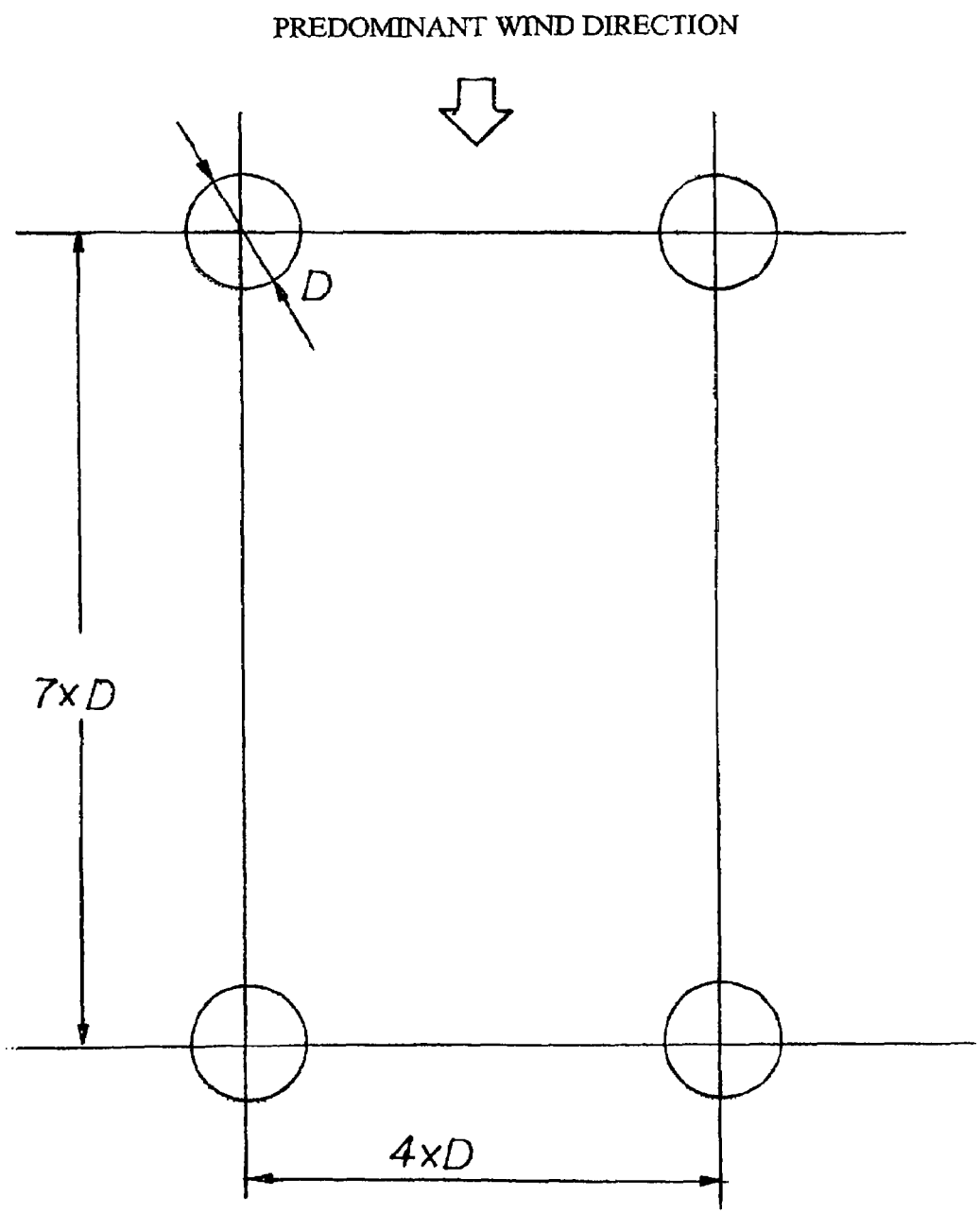
FIG. 10 shows typical wind farm spacing as function of turbine rotor diameter

In preferred embodiments of the present invention, a large numbers of shrouded wind turbine generator towers as described above are spaced apart on a large windy region known as a wind farm as shown in FIG. 10. The recommended spacing perpendicular to the wind is 4×D and the recommended spacing along the direction of the wind is 7×D.

Applicant has conducted a detailed performance analysis of the preferred embodiment wind turbines and conventional horizontal axis wind turbines utilizing the General Electric wind turbine referred to above. The results are shown in Table 3 below.

TABLE 3

Wind Farm Output Comparison in MW per Square Kilometer Preferred Embodiment Wind Turbine vs Conventional Large Axial Flow Wind Turbine

|  | Preferred Embodiment Model KEWT-1.5 Twin turbine tower (As per FIG. 7) | Conventional axial flow General Electric wind turbine GE1.5 |
| --- | --- | --- |
| Wind velocity (m/sec) | 14.0 | 14.0 |
| MW per tower | 1.5 | 1.5 |
| Number of turbines per tower | 2 | 1 |
| MW Individual turbine | 0.75 | 1.5 |
| Rotor diameter (m) | 21.8 | 70.4 |
| Turbine speed (RPM) | 13.0 | 22.0 |
| Tower distance (perp. to wind) (m) | 87.2 | 281.6 |
| Tower distance (along the wind) (m) | 152.5 | 492.8 |
| Number of towers per km2 | 75.2 | 7.2 |
| Total MW per km2 | 112.8 | 10.8 |

Turbine Towers in 1 kW to 150 kW Power Range

Figure 12:
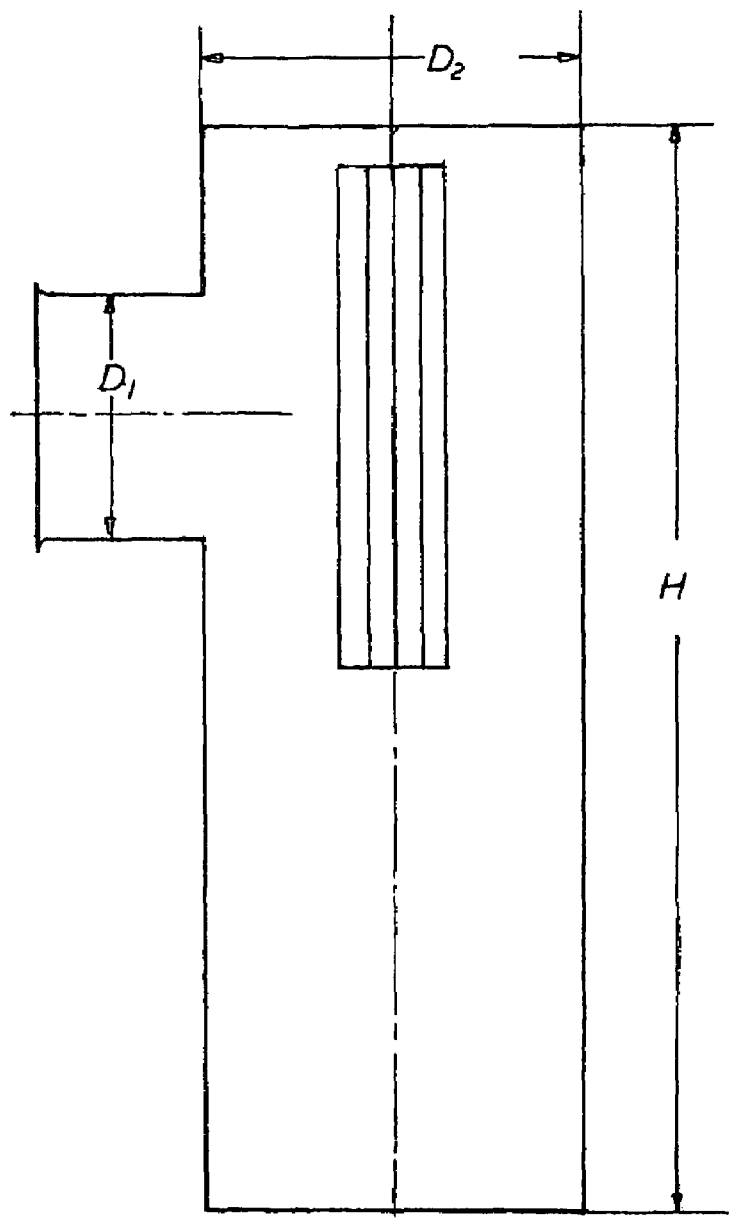
FIG. 12 shows overall proportions of novel wind turbine towers designed for power range of 1 kW to 150 kW.

The overall proportions of wind turbine towers in 1 kW to 150 kW power range have been calculated as shown in the TABLE 4 below. Basic proportions are as shown in FIG. 12. Total height H is approximate because its dependency on the wind profile at particular location.

TABLE 4

Wind Turbines: 4 kW, 14 kW and 152 kW

| Number of turbine per tower | 1 | 1 | 1 |
| --- | --- | --- | --- |
| kW Individual turbine | 1.25 | 14.0 | 152 |
| Rotor diameter, D1 (m) | 0.91 | 3.0 | 10.0 |
| Turbine speed (RPM) | 303 | 90 | 27.5 |
| Total height, H (m) | 7 | 12 | 25 |
| Reynods Number @ 13 m/sec | 1,080,000 | 3,600,000 | 11,880,000 |

Bird Screens

Applicant believes that the present invention will provide tremendous environmental advantages over typical prior are large wind turbine generators as described above. One of the environmental advantages is that the preferred embodiment will be much less dangerous to birds. However some birds could be blown into the mouth of the turbine. To virtually eliminate danger to birds a screen could be placed in front of the turbine with some decrease in turbine output. Various screen designs are possible including a simple flat screen, spherical screen and a conical screen that would tend to deflect a bird impacting the screen.

Variations

Whereas the present invention has been described in terms of a specific preferred embodiment persons skilled in the wind turbine generator art will recognize that many variations can be made within the general scope of the invention. As indicated above many different size turbines could be preferred depending on various conditions and criteria. The towers could be built for one turbine or for more than two. For example where space is limited or more power per square kilometer is needed, three or four turbines per tower may be preferred. Although the cylindrical tower design seems to be best, other tower shapes, especially towers with a cross section similar to a circle (such as towers with a slightly oval cross section) can give similar results. Also modifications can be made to the portions of the tower opposite the side facing into the wind without much effect on system performance although with some experimentation some improvement in performance may be realized. The invention is intended to cover any tower design where the exhaust form a shrouded turbine is directed into a low pressure region at the sides of the tower. The pressure drop factor of 3 times of the wind stagnation pressure has been well researched and test proven with air flow across a cylinder body for wide range of Reynolds numbers. Ref. 1 book "Technische Stromungslehre" by Dr. Bruno Eck, Abb. 253 shows the static pressure distribution over the cylinder body for both turbulent and laminar air flows. The generally cylindrical structure does not have to be positioned vertically. For example, where the wind is normally in a single direction, the structure could be a very long cylinder mounted horizontally on thin legs with a large number of turbines mounted within the structure.

A very important factor in the design of preferred embodiments of the present invention is minimization of the effect of the turbine air flow exiting at the sides of the vertical towers on the static pressure at those locations. Therefore, the internal ducting geometry required for a gradual and even turbine discharge flow distribution to the sides of the cylinder is important to minimize the effect of turbine discharge flow on the low static pressure generated by wind blowing past the towers.

What is claimed is:

1. An ultra-high power density wind turbine system for producing energy from a wind comprising:
   A) a structure having a shape adapted to produce a positive wind pressure on a high-pressure portion of a surface that faces into the wind and to produce a vacuum on two low pressure portions of its surface,
   B) one or more shrouded wind turbine system mounted in the structure and comprising turbine stator vanes, turbine rotor blades and a turbine discharge duct adapted to channel turbine exhaust to exit the structure at the two low-pressure portions of the surface,
   wherein the one or more wind turbine systems are horizontal axis, axial flow shrouded wind turbines.

2. The wind turbine system as in claim 1 wherein the structure is a vertical tower.

3. The wind turbine system as in claim 2 wherein the vertical tower has a shape that is generally cylindrical.

4. The wind turbine system as in claim 2 and further comprising an automatic tower rotation system adapted to maintain the tower in position so that the one or more wind turbines are substantially always facing approximately into the wind.

5. The wind turbine system as in claim 2 wherein the vacuum (representing a differential pressure relative to and lower than atmospheric pressure) on the two low pressure portions is greater than the positive wind pressure (representing a differential pressure relative to and higher than atmospheric pressure) on the high pressure surface.

6. The wind turbine system as in claim 2 wherein a pressure differential across the one or more turbine systems is more than twice the positive wind pressure (representing a differential pressure relative to and higher than atmospheric pressure) on the high pressure portion.

7. The wind turbine system as in claim 2 wherein a pressure differential across the one or more turbine systems is about three times positive wind pressure (representing a differential pressure relative to and higher than atmospheric pressure) on the high pressure portion.

8. The wind turbine system as in claim 1 wherein the turbine stator vanes are positioned in front of rotor blades.

9. The wind turbine system as in claim 8 wherein the turbine stator vanes are variable flow area turbine stator vanes.

10. The wind turbine system as in claim 9 wherein the turbine stator vanes define an angle relative to the turbine axis which is adjustable to control the airflow through the turbine.

* * * * *